(12) United States Patent
Nana Mboyo et al.

(10) Patent No.: US 12,491,865 B2
(45) Date of Patent: Dec. 9, 2025

(54) METHOD FOR OPERATING A PARKING ASSISTANCE, COMPUTER PROGRAM PRODUCT, PARKING ASSISTANCE SYSTEM, VEHICLE AND SYSTEM

(71) Applicant: Valeo Schalter und Sensoren GmbH, Bietigheim-Bissingen (DE)

(72) Inventors: Clautilde Yvette Nana Mboyo, Bietigheim-Bissingen (DE); Paul Moran, Tuam (IE); Piotr Szczytowski, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 113 days.

(21) Appl. No.: 18/036,264

(22) PCT Filed: Oct. 19, 2021

(86) PCT No.: PCT/EP2021/078880
§ 371 (c)(1),
(2) Date: May 10, 2023

(87) PCT Pub. No.: WO2022/100967
PCT Pub. Date: May 19, 2022

(65) Prior Publication Data
US 2023/0415728 A1 Dec. 28, 2023

(30) Foreign Application Priority Data
Nov. 10, 2020 (DE) ..................... 10 2020 129 520.0

(51) Int. Cl.
*B60W 30/06* (2006.01)
*G06V 10/25* (2022.01)
(Continued)

(52) U.S. Cl.
CPC ............. *B60W 30/06* (2013.01); *G06V 10/25* (2022.01); *G06V 10/44* (2022.01); *G06V 10/764* (2022.01);
(Continued)

(58) Field of Classification Search
CPC ............ B60W 30/06; B60W 2420/403; G06V 10/25; G06V 10/44; G06V 10/764; G06V 20/586; B60D 15/0285; G06N 3/02
(Continued)

(56) References Cited

U.S. PATENT DOCUMENTS 9,587,948 B2 * 3/2017 Schuller ............... G06V 30/422
2016/0307052 A1 10/2016 Han et al.
2020/0117926 A1 4/2020 Kim

FOREIGN PATENT DOCUMENTS

DE 102017007823 A1 4/2018
DE 102017107700 A1 10/2018
(Continued)

OTHER PUBLICATIONS

International Search Report and Written Opinion in corresponding International Application No. PCT/EP2021/078880, dated Jan. 31, 2022 (12 pages).
(Continued)

*Primary Examiner* — Hai H Huynh
(74) *Attorney, Agent, or Firm* — Osha Bergman Watanabe & Burton LLP (57) ABSTRACT

A method for operating a parking assistance system for a vehicle involves a) receiving an optical image of an environment of the vehicle and a digital environment map representing the environment of the vehicle, the digital environment map including at least one designated parking area, b) selecting, for each designated parking area, a region of interest in the received optical image corresponding to the
(Continued)

respective designated parking area, c) detecting, in each selected region of interest, lines and/or symbols provided on the ground, d) assigning one of many parking slot classes to each selected region of interest based on the detected lines and/or symbols, and e) determining, for each designated parking area, if the respective designated parking area corresponding to the selected region of interest is a potential parking slot based on the parking slot class assigned to the corresponding region of interest.

13 Claims, 7 Drawing Sheets

(51) Int. Cl.
  *G06V 10/44* (2022.01)
  *G06V 10/764* (2022.01)
  *G06V 20/56* (2022.01)
(52) U.S. Cl.
  CPC ..... *G06V 20/588* (2022.01); *B60W 2420/403* (2013.01)
(58) Field of Classification Search
  USPC ..................................... 701/41–44
  See application file for complete search history.

(56) References Cited

FOREIGN PATENT DOCUMENTS

| | | |
|---|---|---|
| DE | 102018005761 A1 | 1/2020 |
| DE | 102018119897 A1 | 2/2020 |
| JP | 2009-205191 A | 9/2009 |
| JP | 2015030363 A | 2/2015 |
| JP | 2020-084007 A | 6/2020 |
| JP | 6704483 B1 | 6/2020 |
| JP | 2020-144627 A | 9/2020 |
| JP | 2021-180382 A | 11/2021 |
| KR | 101261409 B1 | 5/2013 |
| KR | 102011704 B1 | 8/2019 |

OTHER PUBLICATIONS

German Search Report in corresponding German Application No. 10 2020 129 520.0, dated Jul. 16, 2021 (7 pages).
Office Action issued in counterpart Japanese Patent Application No. 2023-527814 mailed Aug. 6, 2024 (11 pages).
Office Action issued by the Korean Patent Office for corresponding Korean Patent Application No. 2023 7015847, mailed Aug. 25, 2025 (27 pages).

\* cited by examiner

|  | CLS | PRIO |
|---|---|---|
| Symbol/pattern | Class | Priority |
| <none> | 1 | 2 |
| X (crossed lines) | 100 | - |
| W (zig-zag-lines) | 100 | - |
| //// (parallel slanted lines) | 100 | - |
| 🚫 | 100 | - |
| ⊗ | 100 | - |
| ♿ | 10 | 1 |
| 👫 | 12 | 5 |
| 🤰 | 14 | 10 |
| 👩 | 16 | 1 |
| 🛒 | 18 | 5 |
| 🔌🚗 | 20 | 10 |
|  |  |  |

METHOD FOR OPERATING A PARKING ASSISTANCE, COMPUTER PROGRAM PRODUCT, PARKING ASSISTANCE SYSTEM, VEHICLE AND SYSTEM

The invention relates to a method for operating a parking assistance system of a vehicle, a computer program product, a parking assistance system for a vehicle, a vehicle comprising a parking assistance system and a system comprising a vehicle and an external unit.

Parking assistance systems are known that employ camera images to detect parking slots in the environment of the vehicle. For example, such systems detect and analyze lines that are painted on the ground to detect parking slots.

An increasing variety of special purpose parking slots are becoming prominent, which are exclusive for certain groups of people or vehicles, such as parking slots for disabled people, for families with little children, for women, for urgent or emergency situations, for electric vehicles and so on. These parking slots are often designated by symbols or letters or the like. To avoid parking tickets or other more severe issues, the driver of a car has to have an understanding of the meaning of all the various symbols, which can be complicated, in particular since the use of the symbols may differ from country to country, from state to state or even from district to district.

DE 10 2017 007 823 A1 discloses that environmental images are captured by means of an in-vehicle camera and special parking spaces are detected based on the environmental images. Furthermore, special equipment for persons with physical impairment and/or a child seat arranged in the vehicle is detected and properties of at least one vehicle occupant are derived from this information. Special parking places corresponding to the derived properties are offered as a destination.

It is one objective of this invention to improve the operation of a parking assistance system of a vehicle.

According to a first aspect a method for operating a parking assistance system for a vehicle is suggested. In a first step a), an optical image of an environment of the vehicle and a digital environment map representing the environment of the vehicle is received. The digital environment map includes at least one designated parking area. In a second step b) a region of interest in the received optical image corresponding to the respective designated parking area is selected for each of the at least one designated parking areas included in the environment map. In a third step c) lines and/or symbols provided on the ground are detected in each selected region of interest. In a fourth step d), one of a plurality of parking slot classes is assigned to each selected region of interest based on the detected lines and/or symbols. In a fifth step e) it is determined for each of the at least one designated parking areas if the respective designated parking area corresponding to the selected region of interest is a potential parking slot based on the parking slot class assigned to the corresponding region of interest.

This method has the advantage that parking slots can be discriminated by the parking assistance system based on lines and/or symbols that are provided on the ground. Particularly, special purpose parking slots can be differentiated from normal parking slots and potential parking slots that are marked as no-parking areas can be detected. Thus, operation of the parking assistance system is improved.

The optical image of the environment of the vehicle may be detected by a camera of the vehicle. Preferably, the optical image corresponds to a surround-view image of the vehicle. A surround-view image may show the environment of the vehicle from a bird's-eye perspective from above the vehicle. A surround-view image may be obtained by merging and/or stitching several images that each cover a certain field of view.

The digital environment map corresponds to a digital representation of the actual environment of the vehicle. The environment map may be determined by a processing unit of the vehicle, such as an ECU (engine control unit) or the like, based on sensor signals detected by environment sensors arranged on the vehicle, such as ultrasonic and/or optical sensor units.

The processing unit, which provides the digital environment map, is preferably also configured to detect parking slot demarcation lines. This detection is based, for example, on optical images detected by optical sensor units, such as cameras. Based on detected parking slot demarcation lines, the processing unit is further configured to designate potential parking areas that are arranged in the surrounding of the vehicle. A potential parking area is an area that is delimited by demarcation lines on the ground, for example, and that is free, that is, the area is not blocked by an object or another vehicle or the like. For example, potential parking areas may be arranged on a roadside parking strip or on a car park, or the like. The processing unit, when designating parking areas, does not consider lines and/or symbols that are provided on the ground in the respective area which are not demarcation lines.

Each designated parking area corresponds to an area in the optical image of the environment. Thus, for each designated parking area, a corresponding region of interest is selected in the optical image.

Then, the region of interest is analyzed for lines and/or symbols that are present therein. Based on the detected lines and/or symbols, one of a plurality of parking slot classes is assigned to each selected region of interest. For example, if no lines or symbols are detected, the region of interest may be assigned to a "standard parking slot"-class, and if a wheelchair symbol is detected, the region of interest may be assigned to a "disabled parking slot"-class. Since a respective region of interest corresponds to a designated parking area, the parking slot class assigned to the region of interest applies to the designated parking area as well. Here, "lines" may specifically refer to demarcation lines provided on the ground. For example, demarcation lines can all have a similar appearance with respect to the line width and color. That is, lines that have a different appearance than expected for demarcation lines may be considered as representing a symbol in this sense.

Based on the assigned parking slot classes, it is determined for each of the at least one designated parking areas that the respective designated parking area corresponding to the selected region of interest is a potential parking slot. A potential parking slot corresponds to a parking slot that is suitable for the vehicle and for which the driver of the vehicle has a permission to use, for example. This step may involve applying certain filtering criteria and/or priority criteria. For example, it may be set that disabled parking slots are filtered out in this step, that is, they are not considered as a potential parking slot. Such settings may in particular be user-defined and/or may be based on a configuration of the vehicle, such as the vehicle being a plug-in electrical vehicle, and/or may be based on detected additional equipment, such as a baby seat, or the like.

Consequently, the method has the advantage that all kinds of different special purpose parking slots and/or parking-prohibited areas can be detected by the parking assistance system and may be filtered out by the parking assistance system. This achieves a better operation of the parking assistance system, since the user of the vehicle comprising the parking assistance system does not have to double check that he has the permission to use the parking slot suggested by the parking assistance system for parking the vehicle, for example.

According to an embodiment, the method further comprises a step of collating all determined potential parking slots, a step of selecting one of the collated potential parking slots, and a step of providing the selected parking slot to an autonomous driving unit for controlling the vehicle to park in the selected parking slot.

In this embodiment, a selection of one of a plurality of potential parking slots is performed. This is particularly useful in a situation when there are more than one potential parking slots in the environment of the vehicle. The selection may be based on a user interaction, or it may be performed fully automatic.

The step of collating includes ordering the potential parking slots according to some ordering criteria. For example, ordering may be performed based on a distance of the vehicle to the potential parking slot, based on a length and/or width of the potential parking slot, based on the assigned parking slot class corresponding to the potential parking slot and/or based on some other, possibly user-defined, criterium.

The step of selecting one of the potential parking slots may include to output, for example via a display, to the user of the vehicle, a graphical representation of the environment of the vehicle including the potential parking slots, and the user may select one of the potential parking slots by a voice commend, a gesture, a touch command, or the like.

The autonomous driving unit may be configured for controlling the vehicle fully automatic and/or semi-automatic. Full automatic control may include, for example, automatic control of an accelerator, a brake, a steering, a gearbox and so on. Semi-automatic may include control of a steering and of a gearbox for example, wherein a user has to control the accelerator and brake manually.

According to a further embodiment, the further comprises a step of receiving a determining information for at least one of the plurality of classes, wherein step e) is additionally based on the determining information.

The determining information includes information concerning how to determine whether or not a designated parking area is a potential parking slot. In particular, the determining information relates to the plurality of parking slot classes. For example, the determining information may include an information stating that one class of the plurality of parking slot classes, such as "disabled parking slot" or "electric vehicle parking slot", must not be considered as a potential parking slot. The determining information may be provided and/or input by a user of the vehicle. Alternatively, the manufacturer of the vehicle may configure the parking assistance system based on information provided by the customer correspondingly.

This embodiment may allow the user of the vehicle to precisely define, according to his personal situation and needs, which parking slot classes are potential parking slots for him and should therefore be determined by the parking assistance system as potential parking slots, so that the user has the option of using these parking slots for parking the vehicle using the parking assistance system.

According to a further embodiment of the method the determining information includes a priority information for at least one of the plurality of classes, wherein step e) further includes a step of assigning the priority to each of the potential parking slots, and a step of ordering the determined potential parking slots according to the assigned priority.

For example, the priority information may include information stating that a "normal parking slot" having the highest width has the highest priority, and that a "normal parking slot" that is arranged as a roadside parallel parking slot has a low priority. Preferably, the priority information is given as a numerical value, for example a value between 0 and 100, corresponding to a specific property of the parking slot. Specific properties of the parking slot include the assigned parking slot class, a geometric property of parking slots, a relative arrangement of the parking slot relative to other features in the environment, such as parallel, angular or perpendicular parking, free space next to the parking slot, and so on. When assigning the priority, the parking assistance system may be configured to automatically determine a priority score based on the priority information and the individual features of each potential parking slot.

According to a further embodiment of the method, step c) further comprises a step of detecting if the detected lines are arranged similar to one of a plurality of pre-defined patterns, wherein each pre-defined pattern corresponds to at least one parking slot class.

In this embodiment, detected lines may be compared to pre-defined patterns. Such predefined patterns may be patterns that are, for example, provided by local authority or government intended to be used to designate parking slots in a uniform way within a region of power of the authority. The pre-defined patterns may also include patterns that are used customary without being officially defined.

Pre-defined patterns may be defined by using a geometric description, such as a length, a width and/or a curvature of lines, a relative arrangement of a plurality of lines, such as an angle between two lines, an intersection of two lines, a length of a line until an intersection, and others more. It is noted that a dot is also considered as a "line" here.

The term "arranged similar to" is to be understood such that the detected lines may be determined to represent the respective pre-defined pattern. It can be said that it is inferred that the detected lines represent the respective pre-defined pattern.

Detecting that the detected lines are arranged similar to one of a plurality of pre-defined patterns may be based on a similarity score that may be calculated based on a comparison between the actual arrangement of the detected lines and the arrangement of lines in the predefined pattern.

In this embodiment, the detection may be performed by using a deterministic or rule-based algorithm or the like, which may include a heuristic approach.

According to a further embodiment of the method, the pre-defined patterns are defined by geometrical features of the detected lines and/or sections of the detected lines including an absolute length and/or an absolute width of the detected lines, a length ratio between detected lines and/or sections of the detected lines, a width ratio between detected lines and/or sections of the detected lines, an angle formed between detected lines and/or sections of the detected lines, a curvature of detected lines and/or sections of the detected lines and/or a distance between detected lines and/or sections of the detected lines.

For example, an "X"-pattern may be defined as having two lines having essentially the same length and intersecting each other at essentially a midpoint of the lines. As another example, a "zigzag"-line may be defined as having at least three linearly extending lines that are connected at their ends and that include between them an angle in a range between 60°-120°, for example.

According to a further embodiment of the method, each one of the plurality of pre-defined patterns includes a set of values or value-intervals corresponding to at least some of the geometrical features.

According to a further embodiment of the method step c) further comprises a step of extracting the detected symbol of each region of interest as an image, and a step of classifying the image using an artificial intelligence trained for classifying images.

In this embodiment, symbols that are provided on the ground are classified by an artificial intelligence, such as a neural network, that was trained on classifying known symbols. In particular, the artificial intelligence was trained on symbols that are known to be used to mark parking slots. The artificial intelligence may classify the symbols into a number of pre-defined classes. Preferably, each class corresponds to at least one parking slot class.

Firstly, the symbols are extracted from the region of interest as an image. This may include applying a resizing and/or transformation step so as to prepare the image including the symbol such that the artificial intelligence can analyze it.

The artificial intelligence can be trained to recognize (classify) figurative symbols, numbers, characters, words and so on. The artificial intelligence may also take into account the color of structures in the image.

According to a second aspect, a computer program product is suggested. The computer program product comprises instructions which, when the program is executed by a computer, cause the computer to carry out the method according to the first aspect.

A computer program product, such as a computer program medium, may be provided in the form of a memory device, such as a memory card, a USB-stick, a CD-ROM, a DVD, and so on, and/or in the form of a digital data file that can be downloaded from a server in a computer network or the like. For example, this may be achieved by transferring the corresponding file via a wireless network.

According to a third aspect, a parking assistance system for a vehicle is suggested. The parking assistance system comprises a receiving unit for receiving an optical image of an environment of the vehicle and a digital environment map representing the environment of the vehicle, the digital environment map including at least one designated parking area, a selecting unit for selecting, for each of the at least one designated parking areas, a region of interest in the received optical image corresponding to the respective designated parking area, a detecting unit for detecting, in each selected region of interest, lines and/or symbols provided on the ground, an assigning unit for assigning one of a plurality of parking slot classes to each selected region of interest based on the detected lines and/or symbols, and a determining unit for determining, for each of the at least one designated parking areas, if the respective designated parking area corresponding to the selected region is a potential parking slot based on the parking slot class assigned to the corresponding region of interest.

This parking assistance system has the same advantages as described for the method according to the first aspect. The embodiments and features suggested for the method according to the first aspect may also form features and embodiments of the parking assistance system in a corresponding manner.

The respective unit of the parking assistance system, for example the receiving unit, the selecting unit, the detecting unit, the assigning unit and the determining unit may be implemented in hardware and/or in software. When implemented in hardware, the respective unit may be implemented as a computer, a CPU (central processing unit), an ASIC (application specific integrated circuit) or a PLC (programmable logic controller). When implemented in software, the respective unit may be configured as a computer program product, a function, an algorithm, a routine, as part of a programming code or as an executable object. Furthermore, each unit may be implemented as part of a control unit of the vehicle, such as an ECU (engine control unit) or the like.

According to a fourth aspect a vehicle comprising at least one camera for detecting an optical image of an environment of the vehicle, a processing unit for providing an environment map representing the environment of the vehicle based, at least in part, on the detected optical image, and a parking assistance system according to the third aspect is suggested.

According to an embodiment, the vehicle further comprises a communication unit that is configured to transmit the assigned parking slot class corresponding to the designated parking area to an external unit.

This embodiment has the advantage that the detection result obtained by the parking assistance system may be provided to other users or vehicles in the nearby and/or who are planning a trip to the same location, or the like. Specifically, vehicles that do not have the advanced functionality of detecting the parking slot class can then also employ this information when looking for a suitable parking slot. Preferably, a location information of the vehicle, such as GPS coordinates, is transmitted together with the assigned parking slot class.

The communication unit is particularly configured to transmit the information via a modulated electromagnetic signal, such as via Bluetooth®, Wi-Fi, infrared, 3G/4G/5G technology and the like.

According to a fifth aspect, a system comprising at least one vehicle according to the embodiment of the fifth aspect and an external unit external to the vehicle is suggested. The external unit is configured for receiving the transmitted assigned parking slot class from the vehicle and for transmitting the received parking slot class to further devices and/or to transmit a control command in response to the received assigned parking slot class to the vehicle for controlling the vehicle.

The external unit may be implemented as a mobile device, such as a smartphone, or it may be implemented as stationary device, such as a desktop computer or a server, or it may be communication unit of another vehicle or the like.

In preferred embodiments, the communication unit may further transmit a list of potential parking slots to the external unit. Then, a user may select one of the potential parking slots and the external unit sends the selection as the control command to control the vehicle to park autonomously on the selected parking slot.

The invention has been described in terms of different embodiments. It is to be understood that one or more features of any one embodiment may be combinable with one or more features of the other embodiments. In addition, any single feature or combination of features in any of the embodiments may constitute additional embodiments.

Further embodiments or aspects of the invention are subject to the depending claims and the examples which are described in the following with reference to the figures.

In the figures, like elements are denoted with the same reference numerals unless otherwise indicated.

Figure 1:
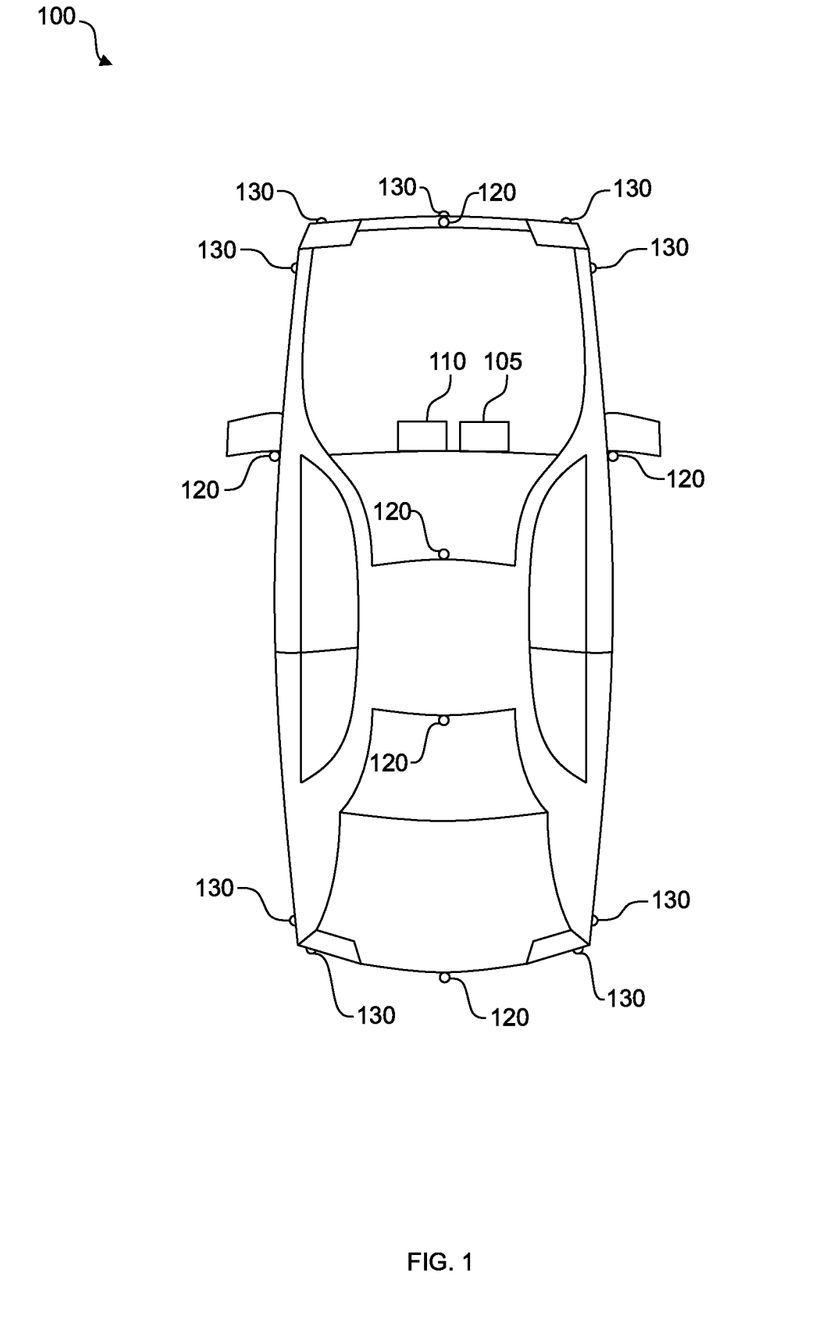
FIG. 1 shows a schematic view of a vehicle.

FIG. 1 shows a schematic view on a vehicle 100, for example a car. The car 100 includes a processing unit 105 and a parking assistance system 110. The processing unit 105 may be implemented as an engine control unit (ECU). Although the processing unit 105 and the parking assistance system 110 are depicted as separate units in FIG. 1, they may be implemented together in a single integrated circuit and/or may share resources, such as a CPU, RAM, and so on. The car 100 further includes a plurality of sensors 120, 130. For example, sensors 120 are implemented as optical sensors, and may include a camera, a Radar and/or a Lidar, or the like. The optical sensors 120 are configured to detect an image, preferably including depth data, of an environment of the car 100 and to output the detected image as an optical sensor signal. Sensors 130 may be implemented as ultrasonic sensors, for example, and are configured to detect a distance to objects 200 (see FIG. 2 or 3) that are arranged in the vicinity of the car 100, and to output the detected distance as an ultrasonic sensor signal. Beside the sensors 120, 130 shown in FIG. 1, the car 100 may include more and/or other sensors, such as a microphone, an accelerometer, an antenna for receiving electromagnetic data signals, and the like.

The processing unit 105 is configured to determine an environment map MAP (see FIG. 2) based on the sensor signals, for example by using sensor fusion technology. The environment map MAP corresponds to a digital representation of the actual environment of the car 100. The processing unit 105 may further be configured to detect parking slot demarcation lines 210 (see FIG. 2) in the optical sensor signal and to designate parking areas P1-P7 in the environment map MAP based on the detected demarcation lines 210. In doing so, the processing unit 105 determines if the space between two demarcation lines 210 is free or is blocked by an object 200, such as another car. If the space is blocked or obstructed, the respective area is not designated as a parking area.

Figure 5:
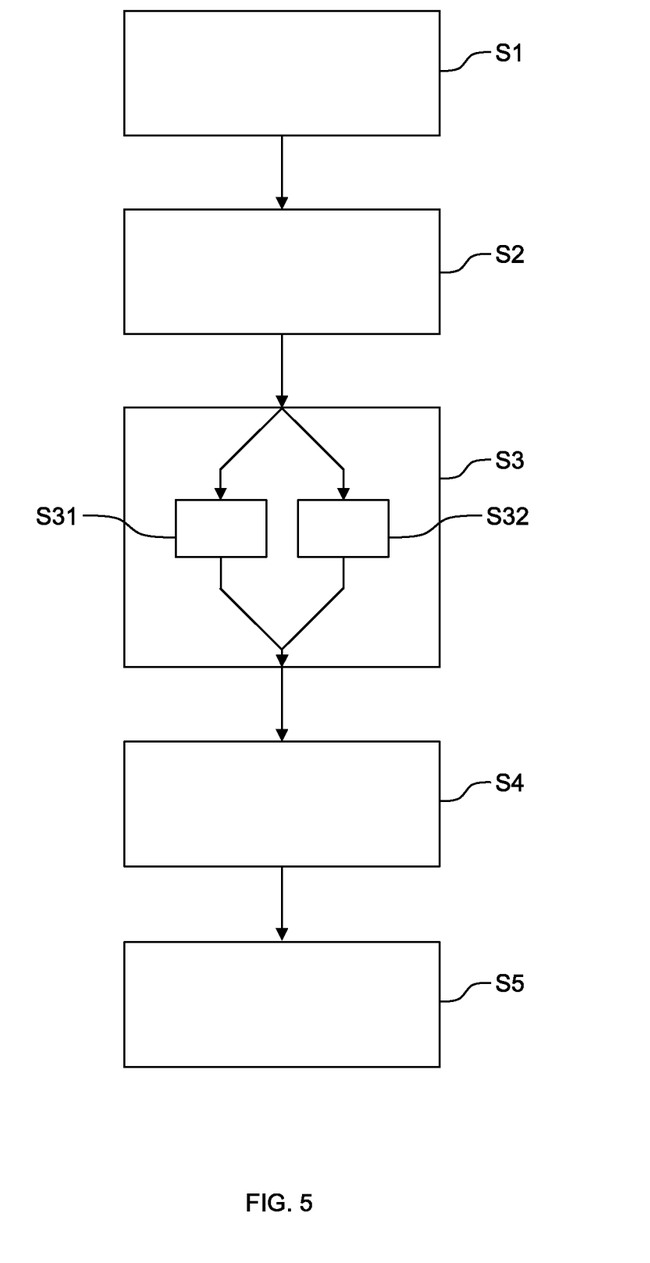
FIG. 5 shows a schematic block-diagram of an example of a method for operating a parking assistance system.
Figure 6:
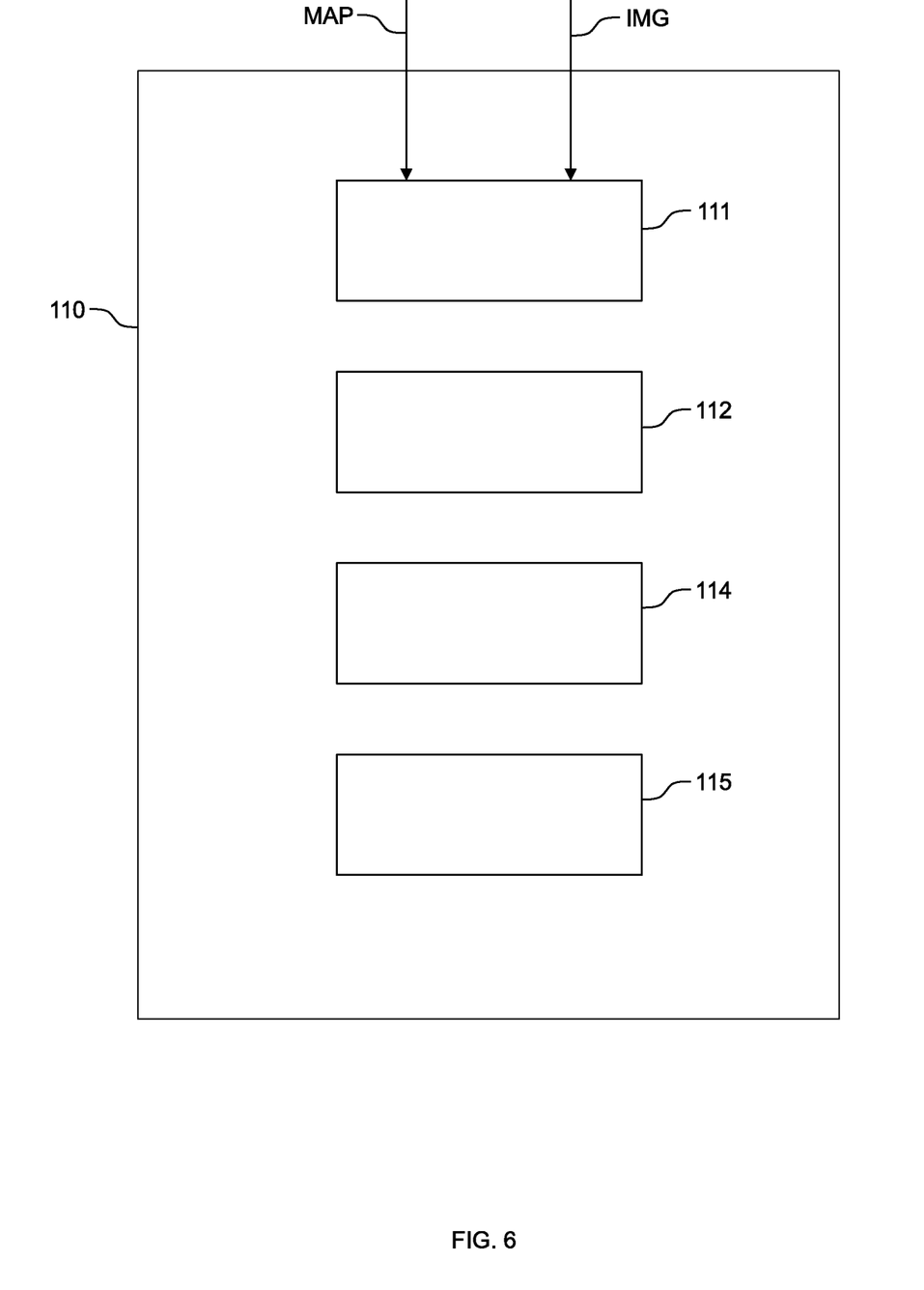
FIG. 6 shows a schematic block-diagram of an example of a parking assistance system.

The parking assistance system 110 may be implemented as shown in FIG. 6 and is configured to perform processing as described in the following corresponding to FIG. 2-5.

Figure 2:
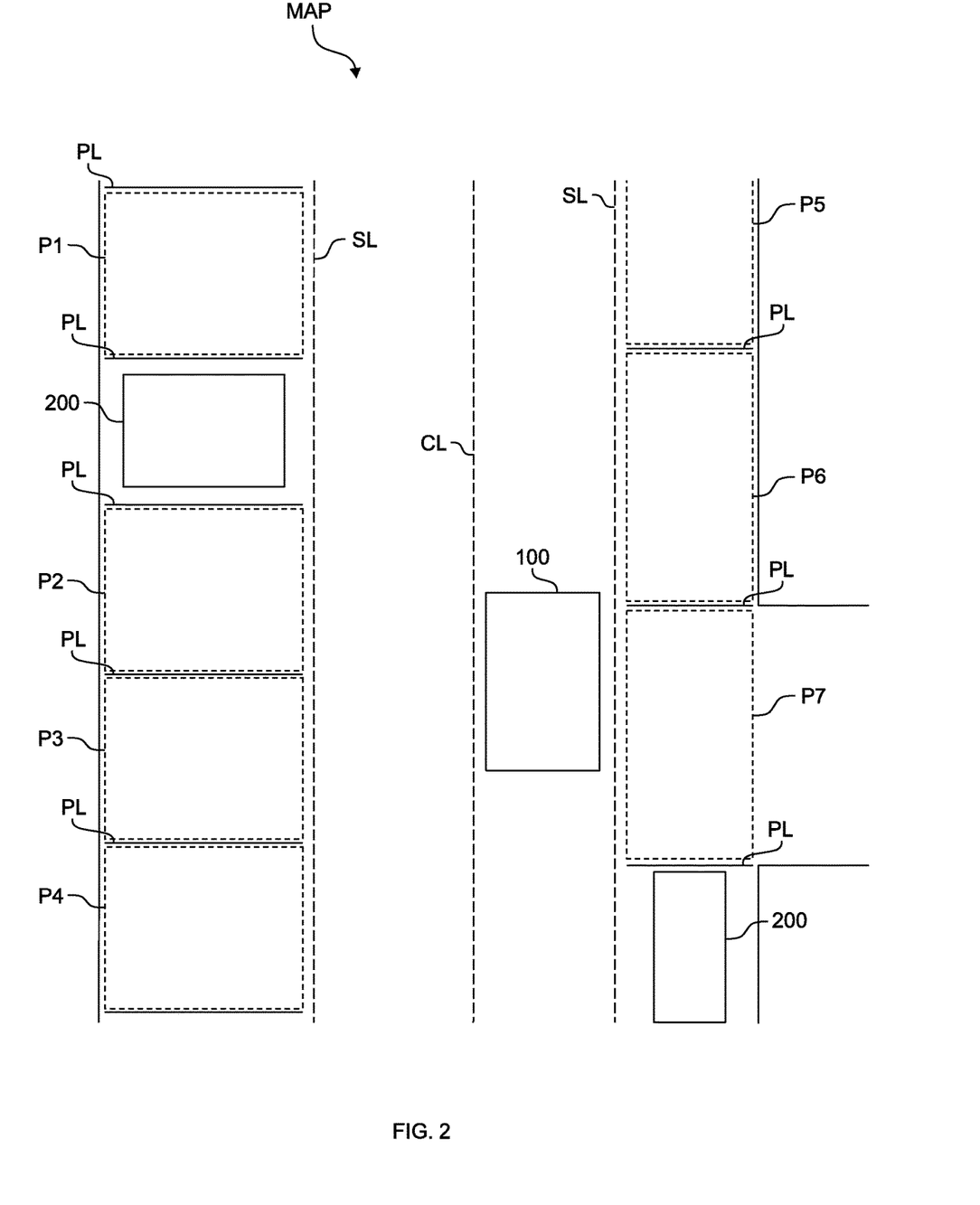
FIG. 2 shows an example of an environment map.

FIG. 2 shows an example of a digital environment map MAP of the vehicle 100. The digital environment map MAP includes geometric objects that represent objects that are arranged in the environment of the vehicle 100. In particular, the digital environment map MAP includes dashed lines CL, SL representing a center line CL of the road and a side line of the road, it includes a geometric object 100 representing the vehicle 100, it includes geometric objects 200 representing vehicles or other obstacles arranged in the environment, it includes further lines (not referenced) that are detected as delimiting a drivable area, it includes parking lines PL that are detected demarcation lines delimiting parking areas and it includes designated parking areas P1-P7. The designated parking areas P1-P7 represent potential parking slots for the vehicle 100. It is noted that the designated parking areas P1-P7 are only preselected based on detecting if the respective area is free or is blocked. Only areas that are free are designated as parking areas P1-P7. For example, the parking assistance system 110 (see FIG. 1, 6 or 7) receives the digital environment map MAP from the processing unit 105 (see FIG. 1).

Figure 3:
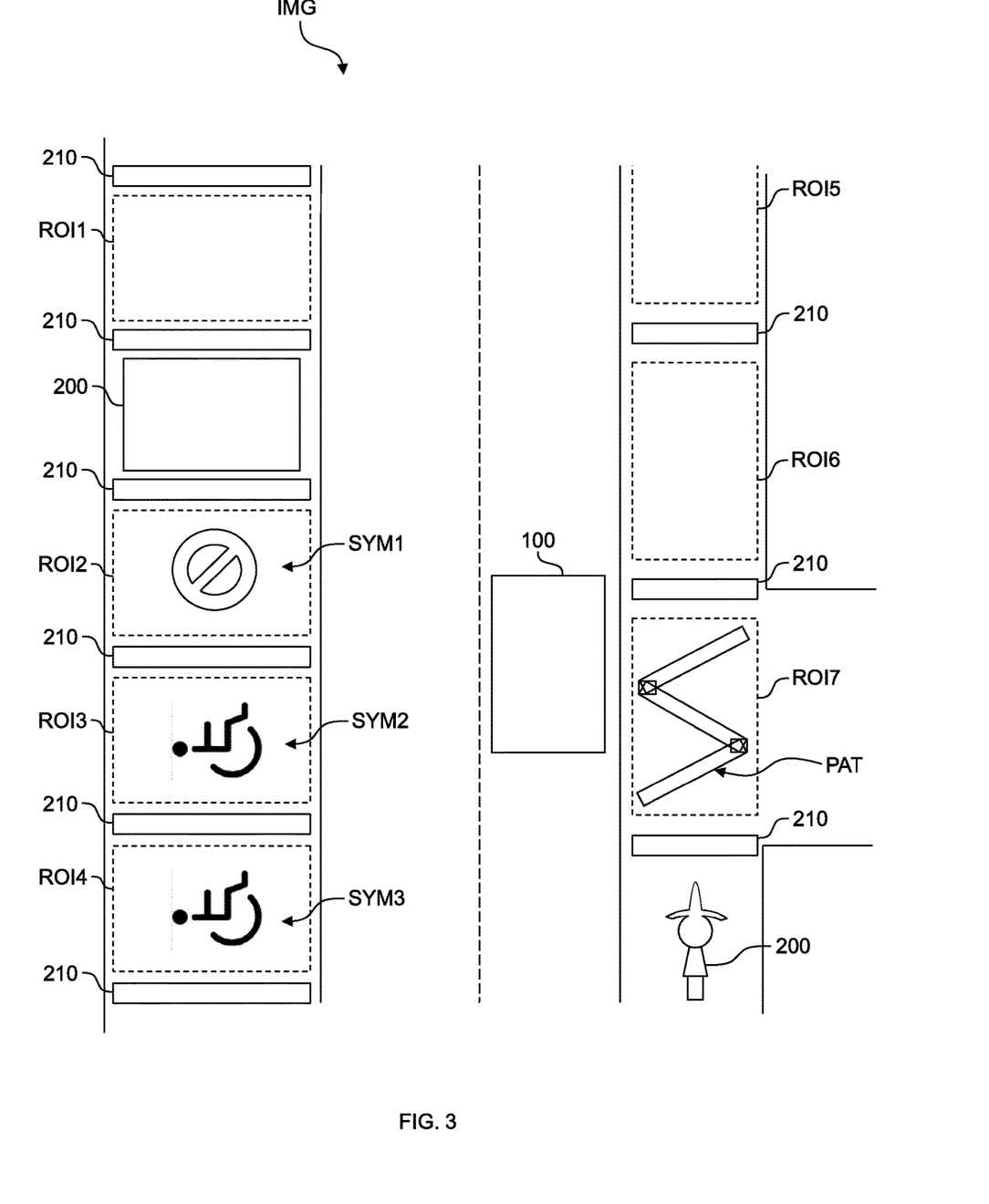
FIG. 3 shows an example of an image of an environment.

FIG. 3 shows an optical image IMG of the environment of the vehicle 100. The optical image IMG corresponds to the digital environment map MAP of FIG. 2. For example, the digital environment map MAP may be determined based, at least in part, on the optical image IMG shown in FIG. 3. For example, the parking assistance system 110 (see FIG. 1, 6 or 7) receives the optical image IMG from the processing unit 105. The parking assistance system 110 selects regions of interest ROI1-ROI7 in the optical image IMG that correspond to the designated parking areas P1-P7 (see FIG. 2) of the digital environment map MAP (see FIG. 2). As can be seen in FIG. 3, the respective region of interest ROI1-ROI7 includes essentially the portion of the optical image IMG that shows the area where the vehicle 100 may potentially be parked.

The parking assistance system 110 detects, for each region of interest ROI1-ROI7, lines PAT and/or symbols SMY1-SYM3 that are provided on the ground. This detection is carried using image recognition techniques, for example. In the example of FIG. 3, a first symbol SYM1 is detected in the region of interest ROI2, a second symbol SYM2 is detected in the region of interest ROI3, a third symbol SYM3 is detected in the region of interest ROI4 and lines PAT are detected in the region of interest ROI7. The first symbol SYM1 represents a "no-parking"-symbol, the second and third symbols SYM2, SYM3 represent "disabled-parking"-symbols, and the lines PAT form a zigzag pattern that represents a "no-parking"-space. For example, there is an inlet that crosses the area corresponding to region of interest ROI7, that is to be kept free of parking vehicles.

Based on the detected lines PAT and/or symbols SYM1-SYM3, the parking assistance system 110 assigns a parking slot class CLS (see FIG. 4) to the respective region of interest ROI1-ROI7. The number of different parking slot classes CLS is not limited per se. The step S4 of assigning a parking slot class CLS corresponds to classifying the designated parking areas P1-P7 according to the available parking slot classes CLS.

Figure 4:
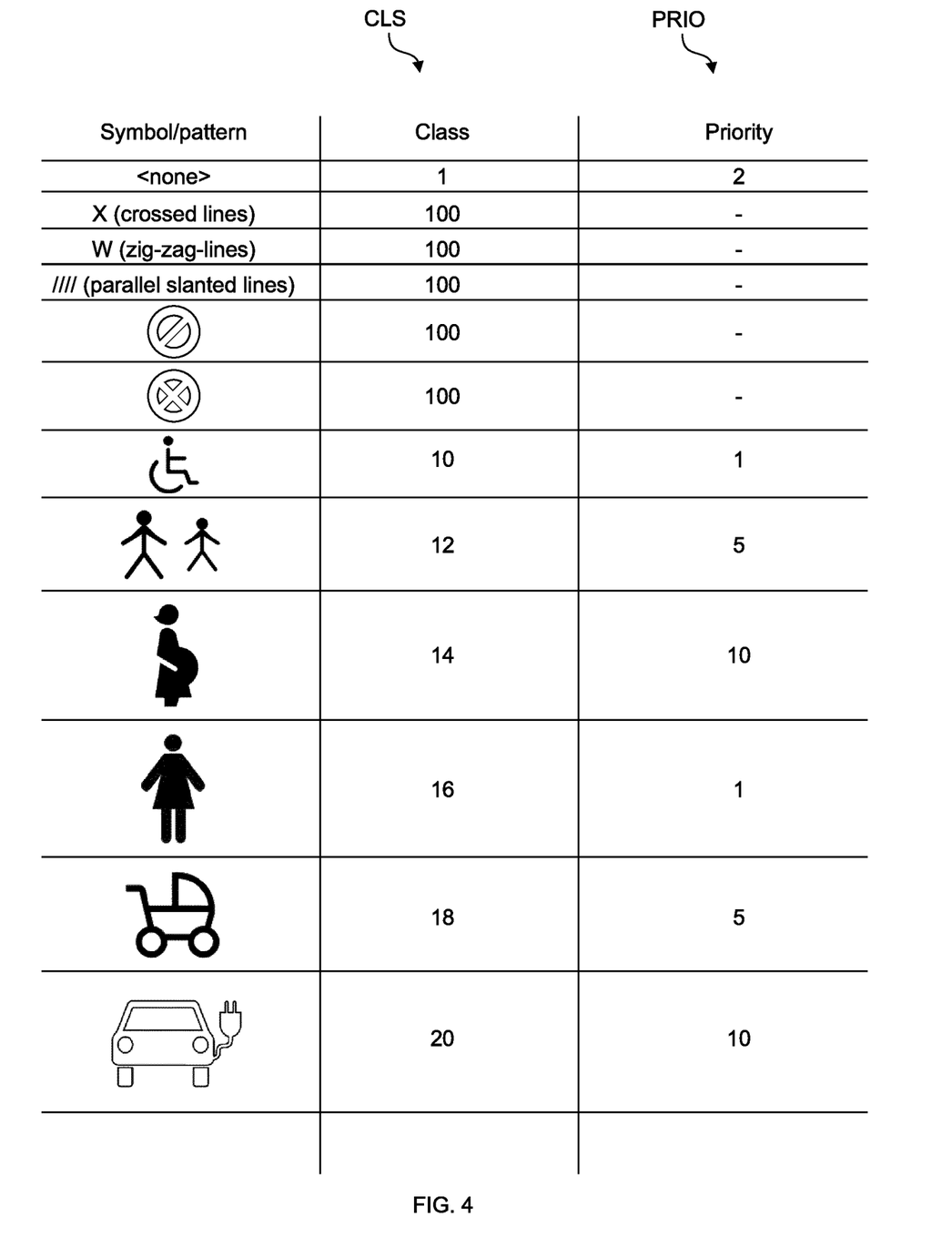
FIG. 4 shows an example of a classification.

FIG. 4 shows a table as an example of such classification of line patterns and symbols into specific parking slot classes CLS. In this example, each class CLS is identified by a numerical value. The table includes three columns in this example, which are the line pattern/symbols, the parking slot class CLS, and a priority PRIO that may be provided for each parking slot class CLS.

The first column of the table of FIG. 4 includes the list of known line patterns and symbols that are used for marking parking slots. Please note that the list of FIG. 4 is not exhaustive, and it may contain many more other line patterns or symbols and/or variations of the line patterns or symbols. As is evident, line patterns and symbols that represent a "no-parking"-area, which are exemplified in rows 3-7 of the table, are each assigned the same class CLS in this example. This may also be the case for different line patterns or symbols that represent other kinds of specific parking slots, for example various symbols that all represent a "disabled-parking" slot (not shown) may all be assigned the same class CLS. Please note that this is not mandatory, and each different line pattern/symbol may be assigned its own class CLS.

In the example of FIG. 4, a priority information PRIO is further assigned for each parking slot class CLS. The priority information PRIO may be provided by a user of the vehicle 100 (see FIG. 1), for example. The priority information PRIO is helpful in situations when there are multiple potential parking slots identified by the parking assistance system 110 (see FIG. 1) in order to provide an ordered list to the user and/or suggest a preferred parking slot based on the priority information PRIO. In this example, all "no-parking"-areas are automatically sorted out and cannot be selected as a parking slot for parking the vehicle 100. For example, the vehicle 100 is a plug-in electric vehicle and the user of the vehicle 100 is a pregnant woman having a kid. The highest priority PRIO is assigned to parking slots designated for electric vehicles and pregnant women. Parking slots designated for families have a lower priority PRIO, which is still higher than the priority PRIO of a conventional parking slot (parking slots without a line pattern/symbol). Parking slots for disabled persons have the lowest priority PRIO, since the user of the vehicle 100 is not a disabled person, and therefore such parking slots should not be parked on.

FIG. 5 shows a schematic block-diagram of an example of a method for operating a parking assistance system 110, for example the parking assistance system 110 of the vehicle 100 of FIG. 1. In a first step S1, an optical image IMG (see FIG. 3) of an environment of the vehicle 100 and a digital environment map MAP (see FIG. 2) representing the environment of the vehicle 100 is received. The digital environment map MAP includes at least one designated parking area P1-P7 (see FIG. 2). In a second step S2, a region of interest ROI1-ROI7 (see FIG. 3) in the received optical image IMG corresponding to the respective designated parking area P1-P7 is selected for each of the at least one designated parking areas P1-P7 included in the environment map MAP. In a third step S3, lines PAT (see FIG. 3) and/or symbols SYM1-SYM3 (see FIG. 3) provided on the ground are detected in each selected region of interest ROI1-ROI7.

In this example, third step S3 includes two steps S31 and S32. Step S31 includes detecting if the detected lines PAT are arranged similar to one of a plurality of pre-defined patterns, such as the line patterns shown in the first column of the table of FIG. 4, wherein each pre-defined pattern corresponds to at least one parking slot class CLS. Step S31 may be carried out by a classical deterministic or rule-based algorithm or the like, which may further include a heuristic approach. Step S32 may include extracting the detected symbol SYM1-SYM3 of each region of interest ROI1-ROI7 as an image, and classifying the image using an artificial intelligence trained for classifying images. For example, step S32 may be carried out by an artificial neural network that was trained on classifying symbols SYM1-SYM3 that are used for marking parking slots. The artificial neural network is preferably trained in a supervised learning approach. The training data used for training the artificial neural network may vary for different regions, countries and/or counties around the world. Please note that step S3 is not required to include the two steps S31, S32 as described, but may as well be implemented in a single step which is carried out by single entity.

In a fourth step S4, one of a plurality of parking slot classes CLS (see FIG. 4) is assigned to each selected region of interest ROI1-ROI7 based on the detected lines PAT and/or symbols SYM1-SYM3. In a fifth step S5, it is determined for each of the at least one designated parking areas P1-P7 if the respective designated parking area corresponding to the selected region of interest ROI1-ROI7 is a potential parking slot based on the parking slot class CLS assigned to the corresponding region of interest ROI1-ROI7.

FIG. 6 shows a schematic block-diagram of an example of a parking assistance system 110, for example the parking assistance 110 of the vehicle 100 of FIG. 1. The parking assistance system 110 may be operated according to the method explained corresponding to FIG. 5. The parking assistance system 110 comprises a receiving unit 111 for receiving an optical image IMG (see FIG. 3) of an environment of the vehicle 100 and a digital environment map MAP (see FIG. 2) representing the environment of the vehicle 100, the digital environment map MAP including at least one designated parking area P1-P7 (see FIG. 2), a selecting unit 112 for selecting, for each of the at least one designated parking areas P1-P7, a region of interest ROI1-ROI7 in the received optical image IMG corresponding to the respective designated parking area P1-P7, a detecting unit 113 for detecting, in each selected region of interest ROI1-ROI7, lines PAT (see FIG. 3) and/or symbols SYM1-SYM3 (see FIG. 3) provided on the ground, an assigning unit 114 for assigning one of a plurality of parking slot classes CLS (see FIG. 4) to each selected region of interest ROI1-ROI7 based on the detected lines PAT and/or symbols SYM1-SYM3, and a determining unit 115 for determining, for each of the at least one designated parking areas P1-P7, if the respective designated parking area P1-P7 corresponding to the selected region of interest ROI1-ROI7 is a potential parking slot based on the parking slot class CLS assigned to the corresponding region of interest ROI1-ROI7.

In particular, the detecting unit 113 may include a deterministic and/or heuristic determination unit for detecting if detected lines PAT are arranged similar to one of a plurality of pre-defined patterns. Furthermore, the detecting unit 113 may include an artificial intelligence, such as an artificial neural network, that was trained for classifying symbols into one of a plurality of classes, each class corresponding to a parking slot class CLS.

Figure 7:
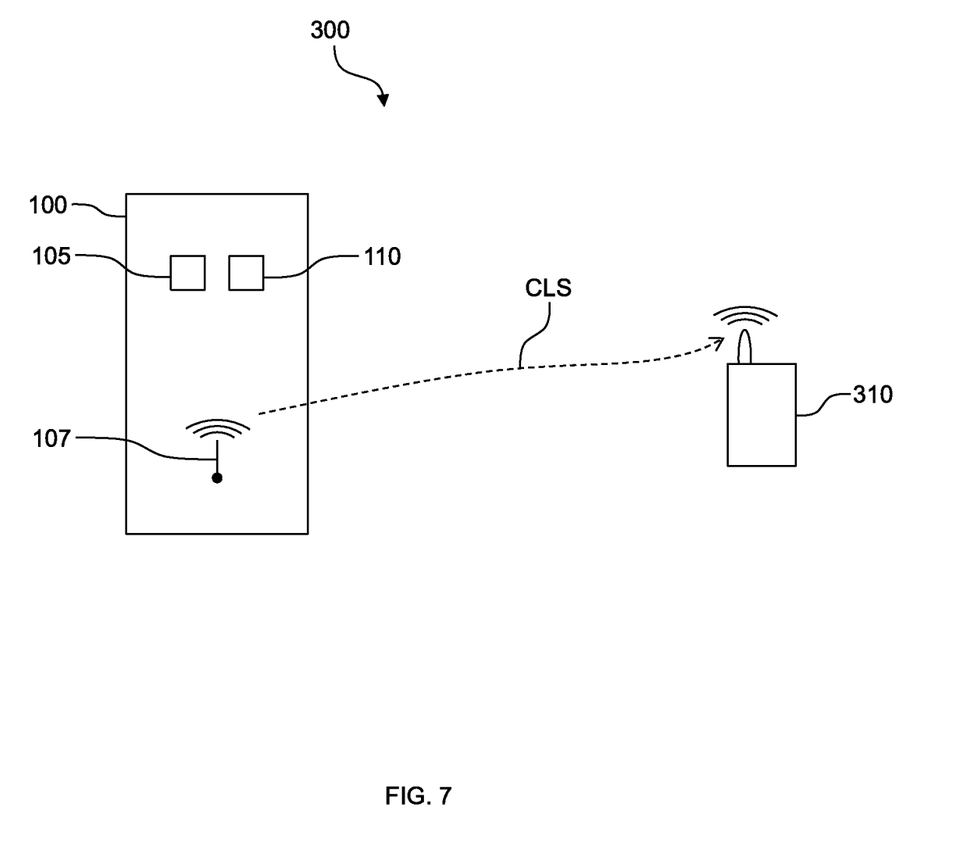
FIG. 7 shows an example of a system with a vehicle and an external unit.

FIG. 7 shows an example of a system 300 with a vehicle 100 and an external unit 310. The vehicle 100 has the features of the vehicle 100 of FIG. 1, and further includes a communication unit 107. The communication unit 107 may be implemented as a mobile radio modem or cellular modem. The external unit 310 may be implemented as a mobile device, such as a smartphone, or it may be a communication unit of another vehicle (not shown) or a stationary device (not shown).

The communication unit 107 is configured to transmit the assigned parking slot class CLS to the external unit 310. For example, the communication unit 107 may connect to the external unit and build a peer-to-peer connection, or it may broadcast the assigned parking slot class CLS using a pre-defined frequency band and/or encoding, and the external unit 310 listens to the pre-defined frequency band and thus may receive the assigned parking slot class CLS.

The external unit may be configured for transmitting a control command (not shown) to the communication unit 107 of the vehicle 100. The control command may include a selection of one of a plurality of potential parking slots determined by the parking assistance system. The control command may also include a determining information for at least one of the plurality of parking slot classes CLS, which the parking assistance system 110 can use when determining if a designated parking area P1-P7 (see FIG. 2) is a potential parking slot.

While the present technology has been described in connection with several practical examples, it is to be understood that the technology is not to be limited to the disclosed examples, but on the contrary, is intended to cover various modifications and equivalent arrangements included within the spirit and scope of the technology.

REFERENCE SIGNS 100 vehicle
105 processing unit
107 communication unit
110 parking assistance system
111 receiving unit
112 selecting unit
113 detecting unit
114 assigning unit
115 determining unit
120 sensor
130 sensor
200 object
210 demarcation line
300 system
310 external unit
CL center line
CLS parking slot class
IMG image
MAP map
P1 designated parking area
P2 designated parking area
P3 designated parking area
P4 designated parking area
P5 designated parking area
P6 designated parking area
P7 designated parking area
PAT lines
PL parking line
PRIO priority information
ROI1 region of interest
ROI2 region of interest
ROI3 region of interest
ROI4 region of interest
ROI5 region of interest
ROI6 region of interest
ROI7 region of interest
S1 method step
S2 method step
S3 method step
S4 method step
S5 method step
SL side line
SYM1 symbol
SYM2 symbol
SYM3 symbol

The invention claimed is:

1. A method for operating a parking assistance system for a vehicle, the method comprising:
   a) receiving an optical image of an environment of the vehicle using a camera, receiving radar data of the environment from a radar sensor, receiving lidar data of the environment from a lidar sensor, receiving ultrasonic data of the environment from an ultrasonic sensor, and creating a digital environment map representing the environment of the vehicle using sensor fusion, the digital environment map including at least one designated parking area,
   b) selecting, for each of the at least one designated parking areas, a region of interest in the received optical image corresponding to the respective designated parking area,
   c) detecting, in each selected region of interest, lines and/or symbols provided on the ground,
   d) assigning one of a plurality of parking slot classes to each selected region of interest based on the detected lines and/or symbols, and
   e) determining, for each of the at least one designated parking areas, if the respective designated parking area corresponding to the selected region of interest is a potential parking slot based on the parking slot class assigned to the corresponding region of interest.

2. The method according to claim 1, further comprising:
collating all determined potential parking slots,
selecting one of the collated potential parking slots, and
providing the selected parking slot to an autonomous driving unit for controlling the vehicle to park in the selected parking slot.

3. The method according to claim 1, further comprising:
receiving a determining information for at least one of the plurality of parking slot classes, wherein step e) is additionally based on the determining information.

4. The method according to claim 3, wherein the determining information includes a priority information (PRIO) for at least one of the plurality of parking slot classes, wherein step e) further includes:
   assigning the priority (PRIO) to each of the potential parking slots, and
   ordering the determined potential parking slots according to the assigned priority (PRIO).

5. The method according to claim 1, wherein step c) further comprises:
   detecting if the detected lines are arranged similar to one of a plurality of pre-defined patterns,
   wherein each pre-defined pattern corresponds to at least one parking slot class.

6. The method according to claim 5, wherein the pre-defined patterns are defined by geometrical features of the detected lines and/or sections of the detected lines including an absolute length and/or an absolute width of the detected lines, a length ratio between detected lines and/or sections of the detected lines, a width ratio between detected lines and/or sections of the detected lines, an angle formed between detected lines and/or sections of the detected lines, a curvature of detected lines and/or sections of the detected lines and/or a distance between detected lines and/or sections of the detected lines.

7. The method according to claim 6, wherein each one of the plurality of pre-defined patterns includes a set of values or value-intervals corresponding to at least some of the geometrical features.

8. The method according to claim 1, wherein step c) further comprises:
   extracting the detected symbol of each region of interest as an image, and
   classifying the image using an artificial intelligence trained for classifying images.

9. A computer program product comprising instructions which, when the program is executed by a computer, cause the computer to carry out the method according to claim 1.

10. A parking assistance system for a vehicle, comprising:
   a receiving unit for receiving an optical image of an environment of the vehicle, radar data of the environment from a radar sensor, lidar data of the environment from a lidar sensor, and ultrasonic data of the environment from an ultrasonic sensor and a digital environment map representing the environment of the vehicle and created using sensor fusion, the digital environment map including at least one designated parking area, a selecting unit for selecting, for each of the at least one designated parking areas, a region of interest in the received optical image corresponding to the respective designated parking area, a detecting unit for detecting, in each selected region of interest, lines and/or symbols provided on the ground, an assigning unit for assigning one of a plurality of parking slot classes to each selected region of interest based on the detected lines and/or symbols, and a determining unit for determining, for each of the at least one designated parking areas, that the respective designated parking area corresponding to the selected region of interest is a potential parking slot based on the parking slot class assigned to the corresponding region of interest.

11. A vehicle comprising:
at least one camera for detecting an optical image of an environment of the vehicle;

a processing unit for providing a digital environment map representing the environment of the vehicle based, at least in part, on the detected optical image; and a parking assistance system according to claim 10.

12. The vehicle according to claim 11, further comprising:
a communication unit that is configured to transmit the assigned parking slot class corresponding to the designated parking area to an external unit.

13. A system comprising:

at least one vehicle according to claim 12; and an external unit external to the vehicle, wherein the external unit is configured for receiving the assigned parking slot class transmitted from the vehicle and for transmitting the received parking slot class corresponding to the designated parking area to further devices and/or to transmit a control command in response to the received assigned parking slot class to the vehicle for controlling the vehicle.

* * * * *